US009487198B2

(12) United States Patent
Kim et al.

(10) Patent No.: US 9,487,198 B2
(45) Date of Patent: Nov. 8, 2016

(54) PEDAL SIMULATOR FOR ACTIVE BRAKE SYSTEM

(71) Applicant: MANDO CORPORATION, Pyeongtaek-si, Gyeonggi-do (KR)

(72) Inventors: Yong-Kap Kim, Suwon-si (KR); Byung-Ki Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 330 days.

(21) Appl. No.: 14/180,937

(22) Filed: Feb. 14, 2014

(65) Prior Publication Data
US 2014/0230429 A1    Aug. 21, 2014

(30) Foreign Application Priority Data

Feb. 20, 2013    (KR) .......................... 10-2013-0018311

(51) Int. Cl.
*B60T 8/40*    (2006.01)
*G05G 5/03*    (2008.04)

(52) U.S. Cl.
CPC ................. *B60T 8/409* (2013.01); *G05G 5/03* (2013.01); *B60T 8/4081* (2013.01)

(58) Field of Classification Search
CPC ........... G05G 5/03; F15B 7/08; B60T 7/042; B60T 7/4081; B60T 7/409; B60T 8/4081
USPC .......................................................... 60/553
See application file for complete search history.

(56) References Cited

U.S. PATENT DOCUMENTS

| 8,201,669 | B2 * | 6/2012 | Ko ........................ F16F 9/5126 188/280 |
| 8,757,734 | B2 * | 6/2014 | Toyohira ................. B60T 7/042 303/113.4 |
| 9,139,168 | B2 * | 9/2015 | Jeon ........................ B60T 7/042 |
| 2012/0103452 | A1 | 5/2012 | Toyohira et al. |

FOREIGN PATENT DOCUMENTS

| KR | 1020040049405 A | 6/2004 |
| KR | 100657576 B1 | 12/2006 |

OTHER PUBLICATIONS

Chinese Office Action dated Dec. 21, 2015 in connection with the counterpart Chinese Patent Application No. 201410056893.1.

\* cited by examiner

*Primary Examiner* — Logan Kraft
(74) *Attorney, Agent, or Firm* — Hauptman Ham, LLP

(57) ABSTRACT

Disclosed herein is a pedal simulator for an active brake system. The pedal simulator includes a simulator block provided therein with a bore, a first reaction unit including a first reaction piston slidably installed in the bore, a first damping member installed at the first reaction piston, and a first reaction spring compressed by the first reaction piston, and a second reaction unit including a second reaction piston provided in the bore to support the first reaction spring and slide in the bore, a damping housing connected to the simulator block to be spaced a certain distance apart from the second reaction piston, a second reaction spring installed between the second reaction piston and the damping housing to be compressed by the second reaction piston, and a second damping member installed in the damping housing to contact the second reaction piston.

14 Claims, 7 Drawing Sheets

PEDAL SIMULATOR FOR ACTIVE BRAKE SYSTEM

CROSS-REFERENCE TO RELATED APPLICATION(S)

This application claims the benefit of Korean Patent Application No. 2013-0018311, filed on Feb. 20, 2013 in the Korean Intellectual Property Office, the disclosure of which is incorporated herein by reference.

BACKGROUND

1. Field

Embodiments of the present invention relate to a pedal simulator for an active brake system which may improve pedal feel.

2. Description of the Related Art

Generally, an active hydraulic boost (AHB) is a brake system that generates braking force when a driver pushes the pedal by sensing the push through an electronic control unit and supplying hydraulic pressure to the master cylinder through operation of a hydraulic pressure generation unit, thereby transferring hydraulic pressure for braking to a wheel cylinder of each wheel. In the case of such AHB, when the driver pushes the pedal to implement normal braking, a pedal displacement sensor senses the displacement of the brake pedal. The electronic control unit operates the hydraulic pressure generation unit and controls supply of the hydraulic oil stored in a hydraulic oil reservoir to a boost chamber of the master cylinder to produce pressure in the master cylinder. The pressure produced in the master cylinder presses a piston in the master cylinder to produce hydraulic brake pressure. This hydraulic brake pressure is transferred to the wheel cylinder, producing braking force.

In the case that the pressure in the master cylinder changes during regenerative braking, the resulting force may be directly transferred to the brake pedal, thereby adversely affecting pedal feel. When the pedal feel is degraded in this way, the pedal feel that the driver experiences through braking may become vastly different from the actual level of pressure applied to the brake disc of the brake pad in the wheel cylinder, resulting in excessive or insufficient braking. Thereby, disposable components such as the brake pad may need to be frequently replaced and sudden braking or failure of braking leading to a traffic accident may occur.

Figure 1:
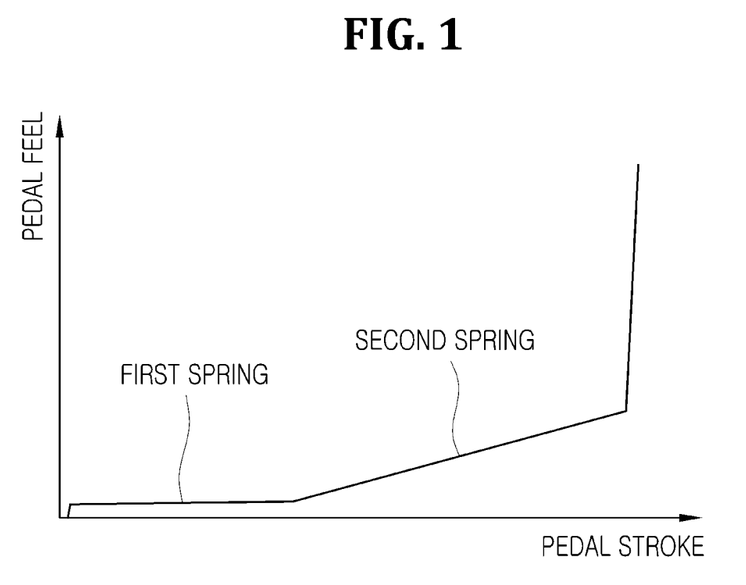
FIG. 1 is a graph illustrating a relationship between the pedal stroke produced by a conventional pedal simulator and pedal feel.

In conventional cases, a pedal simulator is adopted for the AHB to provide reaction force to the brake pedal. Such a pedal simulator uses, as disclosed in Korean Patent No. 10-0657576, two springs provided therein as shock absorbing members to absorb shock from a simulator piston. However, the two springs merely produce linearly varying pedal feel on the brake as shown in FIG. 1, and may not provide required pedal feel.

CITED REFERENCE

Patent Document

Korean Patent No. 10-0657576 (Date of Patent: Dec. 7, 2006)

SUMMARY

Therefore, it is an aspect of the present invention to provide a pedal simulator for an active brake system which may improve pedal feel by providing a low reaction force at the initial braking stage and high reaction force at the terminal braking stage.

It is another aspect of the present invention to provide a pedal simulator for an active brake system which is provided with an elastic member in order to avoid contact between a second reaction piston formed of metal and a damping housing at the terminal braking stage to prevent drastic increase of pedal force and to provide soft pedal feel.

Additional aspects of the invention will be set forth in part in the description which follows and, in part, will be obvious from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings, of which.

DETAILED DESCRIPTION

Reference will now be made in detail to the embodiments of the present invention, examples of which are illustrated in the accompanying drawings, wherein like reference numerals refer to like elements throughout.

Figure 2:
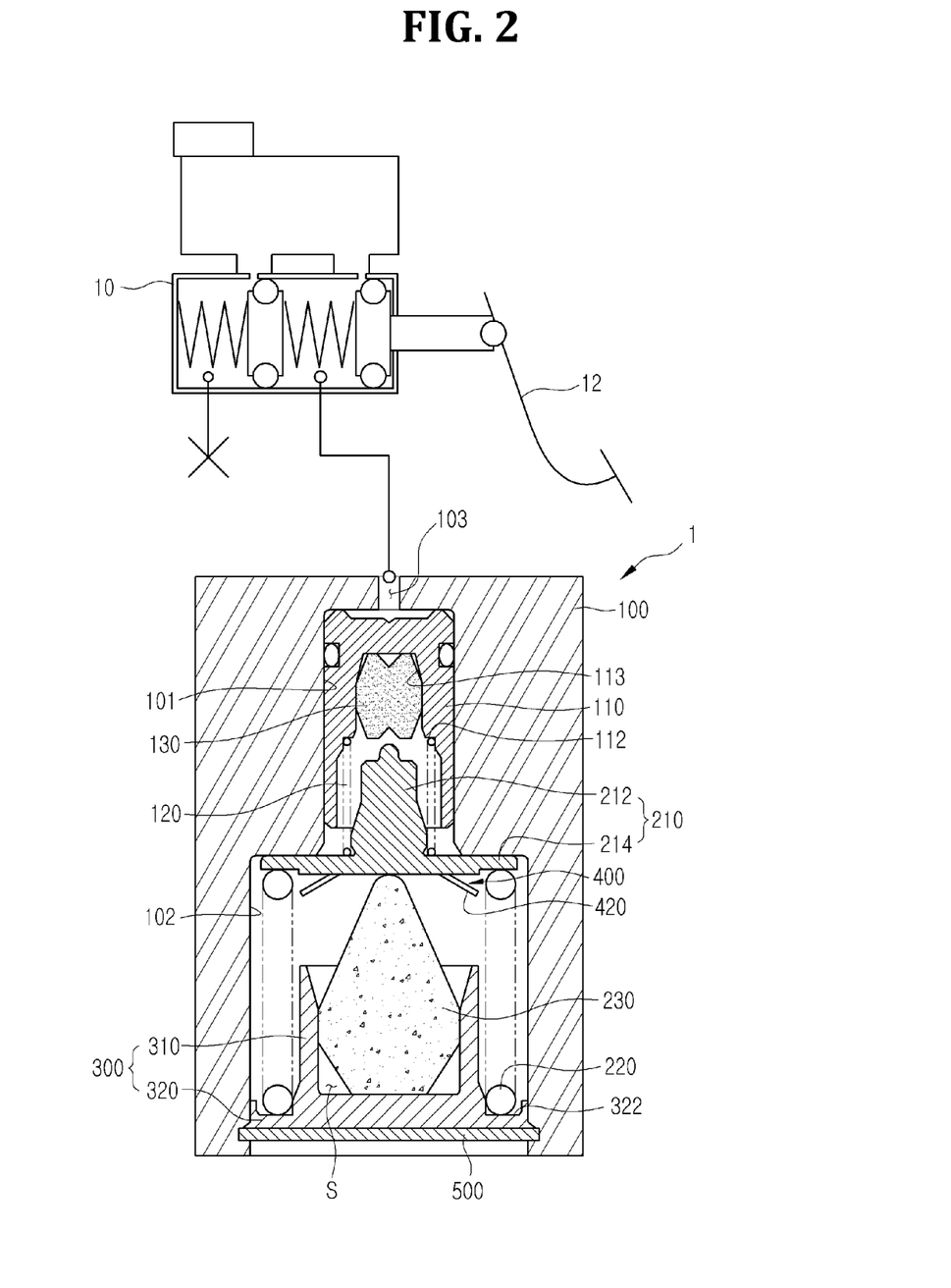
FIG. 2 is a view illustrating a pedal simulator for an active brake system according to an exemplary embodiment of the present invention.

FIG. 2 is a view illustrating a pedal simulator for an active brake system according to an exemplary embodiment of the present invention.

Referring to FIG. 2, the pedal simulator 1 includes a simulator block 100 installed at a master cylinder 10, which is caused to produce hydraulic brake pressure by a brake pedal 12, to accommodate oil from the master cylinder 10, a first reaction unit, a second reaction unit, an elastic member 400 and a damping housing 300. The first reaction unit, second reaction unit, elastic member 400 and damping housing 300 are installed at the simulator block 100 to provide pedal feel. Herein, the first reaction unit and the second reaction unit are arranged in series in a bore formed in the simulator block 100.

The upper portion of the simulator block 100 is provided with an oil hole 103 allowing inflow of hydraulic pressure from the master cylinder 10, and a bore communicating with the oil hole 103. Herein, the bore formed in the simulator block 100 includes a first bore 101, in which the first reaction unit is disposed, and a second bore 102, in which the second reaction unit is disposed, thereby having a stepped shape. Referring to FIG. 2, the first bore 101 has a smaller diameter than the second bore 102.

The damping housing 300 is installed to seal the lower end of the bore. That is, the damping housing 300 is installed at the lower end of the second bore 102. Herein, the damping housing 300, which will be described in detail below, serves to support the second reaction unit.

The first reaction unit includes a first reaction piston 110 slidably installed in the first bore 101, a first damping member 130 installed to move together with the first reaction piston 110, and a first reaction spring 120 compressed by the first reaction piston 110.

When hydraulic pressure is introduced through the oil hole 103 located at the upper portion, the first reaction piston 110 moves downward. Herein, an insertion groove 113 recessed upward is formed at the lower end of the first reaction piston 110. The insertion groove 113 is provided with a stepped portion 112 whose diameter decreases from the lower side of the reaction piston 110 to the upper side of the reaction piston 110. Referring to FIG. 2, the first damping member 130 is inserted into the insertion groove 113 and positioned over the stepped portion 112, and the first reaction spring 120 is supported by the stepped portion 112. Thereby, the first damping member 130 moves when the first reaction piston 110 moves. In addition, the first reaction spring 120 provides reaction force when the first reaction piston 110 moves.

The first reaction spring 120 is formed in a coil shape to provide reaction force to the brake pedal 12. Herein, the lower end of the first reaction spring 120 is supported by the second reaction piston 210, which will be described later.

The first damping member 130 is formed of rubber to be elastically deformable and functions to provide reaction force to the brake pedal 12 when contacted and pressed by a second reaction piston 210, which will be described later.

The second reaction unit includes a second reaction piston 210 slidably provided in the second bore 102, a damping housing 300 installed between the second reaction piston 210 and the damping housing 300 to be compressed by the second reaction piston 210, and a second damping member 230 installed in and supported by the damping housing 300.

Herein, the damping housing 300 is connected to the simulator block 100 such that it is spaced a certain distance from the second reaction piston 210. The damping housing 300 is spaced a certain distance from the second reaction piston 210 and is connected to the lower end of the second bore 102. More specifically, the damping housing 300 includes a cylindrical body 310 having an open top and a flange 320 radially extending from the outer circumferential surface of the lower portion of the body 310.

The body 310 is provided therein with an accommodation space. The second damping member 230 is installed in the accommodation space. The flange 320 is connected to the lower end of the second bore 102, and the upper surface thereof is provided with a support groove 322 to support the second reaction spring 220. The body 310 and the flange 320 are integrally formed.

The second damping member 230 is installed in the accommodation space of the body 310 such that a predetermined space S is defined between the second damping member 230 and the accommodation space. This is intended to allow volumetric change of the space when the second damping member 230 is pressed by the second reaction piston 210 and thus elastically deformed.

Meanwhile, a cap 500 is installed at the lower end of the damping housing 300 to allow the damping housing 300 to be stably fixed to the simulator block 100. That is, the cap 500 is fixed to the simulator block 100 to support the damping housing 300.

The second reaction piston 210 is spaced a certain distance from the first reaction piston 110 to support the lower end of the first reaction spring 120. More specifically, the second reaction piston 210 includes a protrusion 212 arranged at a position facing the insertion groove 113 and protruding toward the first damping member 130, and an extension 214 extending radially outward from the lower end of the protrusion 212.

As shown in FIG. 2, the protrusion 212 protrudes toward the first bore 101. Thereby, the protrusion 212 is positioned inside the first reaction piston 110 and spaced a certain distance apart from the first damping member 130. Herein, the protrusion 212 is inserted into the first reaction spring 120 such that the lower end of the first reaction spring 120 is supported by the extension 214.

The extension 214 is disposed in the bore 102, thereby functioning to support the lower end of the first reaction spring 120 and the upper end of the second reaction spring 220. Herein, since the extension 214 is arranged to apply pressure to the second damping member 230 disposed under the extension 214, the lower surface thereof may have a flat shape.

The second reaction spring 220 is formed in a coil shape to provide reaction force to the brake pedal 12. That is, when the second reaction piston 210 moves, the second reaction spring 220 provides reaction force by being compressed. Herein, the modulus of elasticity of the second reaction spring 220 is greater than that of the first reaction spring 120. Thereby, the second reaction piston 210 is pushed after the first reaction piston 110 is pushed.

The second damping member 230 is formed of rubber so as to be elastically deformable. The second damping member 230 functions to provide reaction force to the brake pedal 12 when the second reaction piston 210 contacts and presses the second damping member 230. As described above, the second damping member 230 is installed in the accommodation space of the body 310, as described above. While the second damping member 230 is illustrated as protruding upward from the open top of the body 310 and contacting the second reaction piston 210, embodiments of the present invention are not limited thereto. The second damping member 230 may be arranged to contact the second reaction piston 210 when the second reaction piston 210 moves a certain distance downward. in addition, the upper portion of the inner lateral surface of the body 310 may be provided with an inclined surface inclined facing outward to facilitate elastic deformation of the second damping member 230 when the second damping member 230 is deformed.

Hardness of the second damping member 230 may be greater than or equal to that of the first damping member 130. This is intended to provide proper pedal feel in braking by dividing the stroke section of the brake pedal 12 into the initial section (see 'A' in FIG. 7) and the terminal section (see 'B' in FIG. 7). For example, in the case that the second damping member 230 has low hardness, it may provide weak reaction force. Thereby, good pedal feel may be provided in the initial section A, but poor pedal feel may be provided in the terminal section B due to yielding pedal movement. In the case that hardness of the second damping member 230 is greater than or equal to that of the first damping member 130, weak reaction force may be provided in the initial section A, and strong reaction force may provided in the terminal section B. Thereby, pedal feel may be improved.

According to one embodiment of the present invention, an elastic member is installed on the lower surface of the second reaction piston such that it is spaced a certain distance from the damping housing. The elastic member functions to prevent direct contact between the second reaction piston and the upper end of the damping housing at the terminal braking stage to provide soft pedal feel. More specifically, referring to FIG. 3, the elastic member is provided with a coupling segment fixed to the lower surface of the second reaction piston and elastic segments arranged spaced a certain distance from each other along the edge of the coupling segment and extending outward.

Figure 3:
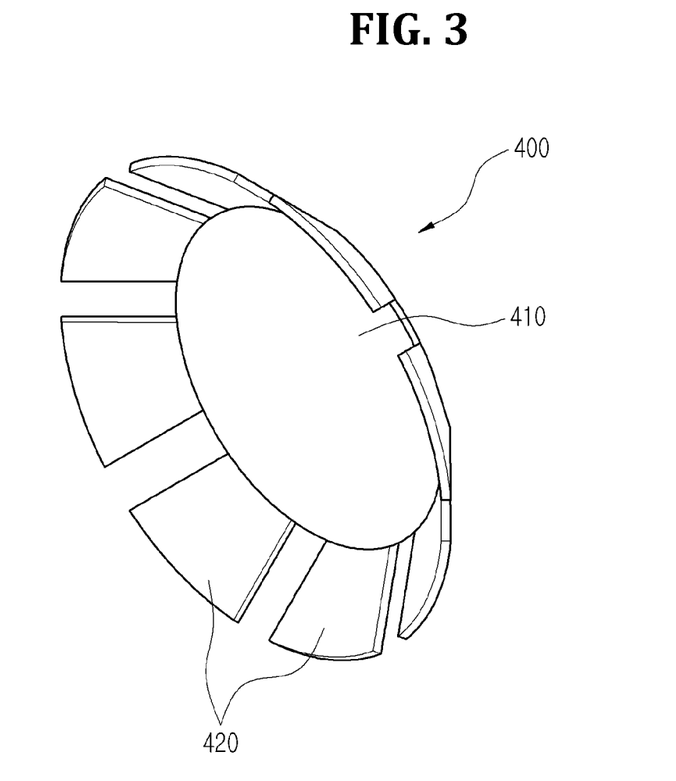
FIG. 3 is a perspective view illustrating an elastic member provided to a pedal simulator for an active brake system according to one embodiment of the present invention.

The coupling segment may be fixed to the lower surface of the second reaction piston through press fitting or by a separate fastening member. A plurality of elastic segments is formed at the edge of the coupling segment and spaced a certain distance from each other. In addition, the elastic members are inclinedly bent downward so as to be elastically deformable. The elastic segments may contact the upper end of the damping housing, i.e., the upper end of the body when the elastic member moves downward together with the second reaction piston and contacts the damping member. As the elastic segments, adapted to provide reaction force by being pressed through contact with the upper end of the damping housing, provides smooth reaction force at the terminal braking stage, smooth pedal feel may be transmitted after the knee point as in a conventional brake system. That is, by preventing the second reaction piston 210 formed of a metallic material from contacting the damping housing 300, abrupt increase in pedal force may be prevented.

The elastic member is integrally formed through a press technique to have a form of a plate spring in the shape of a dish.

In the pedal simulator 1 as above, the first and second reaction units are arranged in series. Thereby, the second reaction piston 210 is pushed after the first reaction piston 110 is pushed. That is, when the first reaction piston 110 is pushed to compress the first reaction spring 120, a first reaction force is produced. As the first damping member 130 is pressed through contact with the second reaction piston 210, the first damping member 130 is elastically deformed to produce a second reaction force. Subsequently, as the lower end of the first reaction piston 110 comes into contact with and presses the second reaction piston 210, a third reaction force is produced by the second reaction spring 220. Subsequently, the second reaction piston 210 compresses the second reaction spring 220 and applies pressure to the second damping member 230 through contact with the second damping member 230. Thereby, a fourth reaction force is produced by the second reaction spring 220 and the second damping member 230. Finally, when the second damping member 230 is further pressed, a fifth reaction force is produced as reaction force according to application of pressure to the elastic segments of the elastic member fixed to the lower surface of the second reaction piston is produced in addition to the reaction force from the second damping member and the second reaction spring. Thereby, pedal feel is transferred to a driver. At this time, the second reaction force and the third reaction force may be produced simultaneously in the cast that the second damping member 230 remains in contact with the second reaction piston 210.

Hereinafter, operation of the pedal simulator for an active brake system as set forth above will be described with reference to FIGS. 4 to 6.

Figure 4:
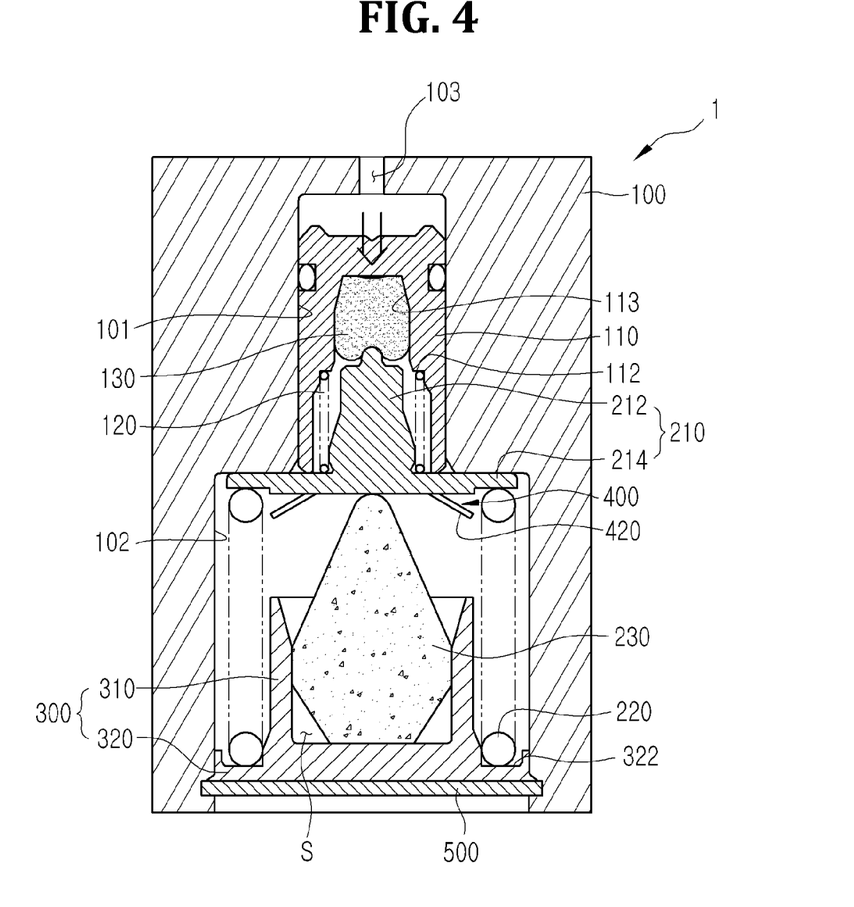
FIGS. 4-6 are views illustrating operation of a pedal simulator for an active brake system according to one embodiment of the present invention.

As shown in FIG. 4, when hydraulic pressure is introduced from the master cylinder (see '10' in FIG. 2) through the oil hole 103 in the simulator block 100, the first reaction piston 110 is pushed to compress the first reaction spring 120. Thereby, reaction force is produced. In addition, the first damping member 130 installed at the first reaction piston 110 is also moved and pressed through contact with the second reaction piston 210, thereby producing reaction force.

Figure 5:
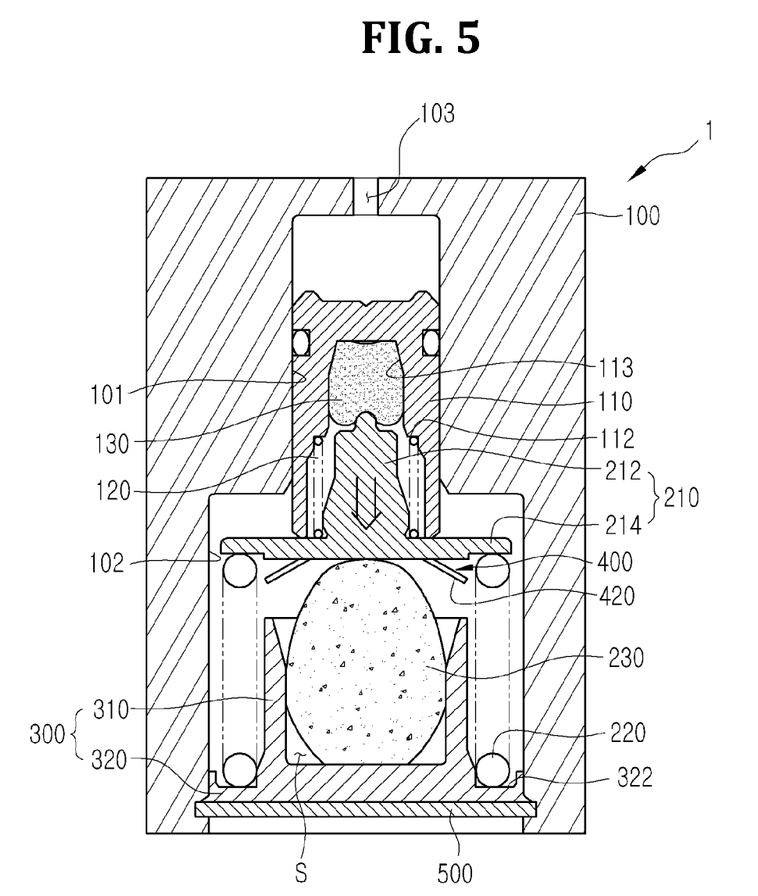
Figure 6:
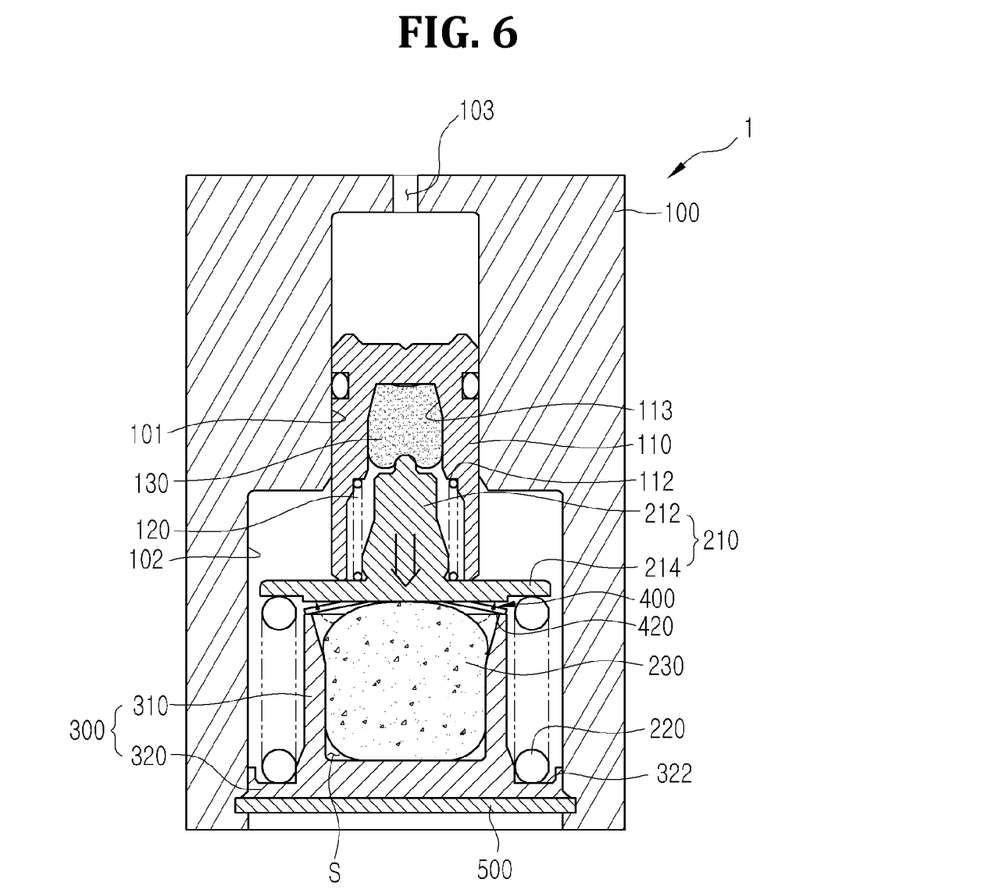

Subsequently, as shown in FIG. 5, when the first reaction piston 110 is moved and thus the lower end thereof comes into contact with the second reaction piston 210, the second reaction piston 210 is pushed, thereby compressing the second reaction spring 220 to produce reaction force. At this time, the second reaction piston 210 applies pressure to the second damping member 230 positioned under the second reaction position 210 through contact. Then, the second damping member 230 is pressed to produce reaction force.

When the second damping member 230 is further pushed, the elastic segments of the elastic member installed at the second reaction piston are pressed through contact with the upper end of damping housing. Thereby, strong reaction force is produced. That is, weak reaction force may be provided at the initial stroke stage (see 'A' in FIG. 7) of the brake pedal (see '12' in FIG. 2) according to reaction forces from the second reaction spring 220 and the second damping member 230, and strong reaction force may be provided to the brake pedal 12 at the terminal stroke stage (see 'B' in FIG. 7) of the brake pedal 12 as reaction force produced by the second reaction spring 220, the second damping member 230 and the elastic member 400 is added.

Meanwhile, when the second damping member 230 is pressed and elastically deformed, the deformation and volumetric change of the second damping member 230 is facilitated by a predetermined space S defined between the damping housing 300 and the second damping member 230. The elastic deformation is also facilitated by the inclined surface formed at the inner side of the upper end of the damping housing 300.

Figure 7:
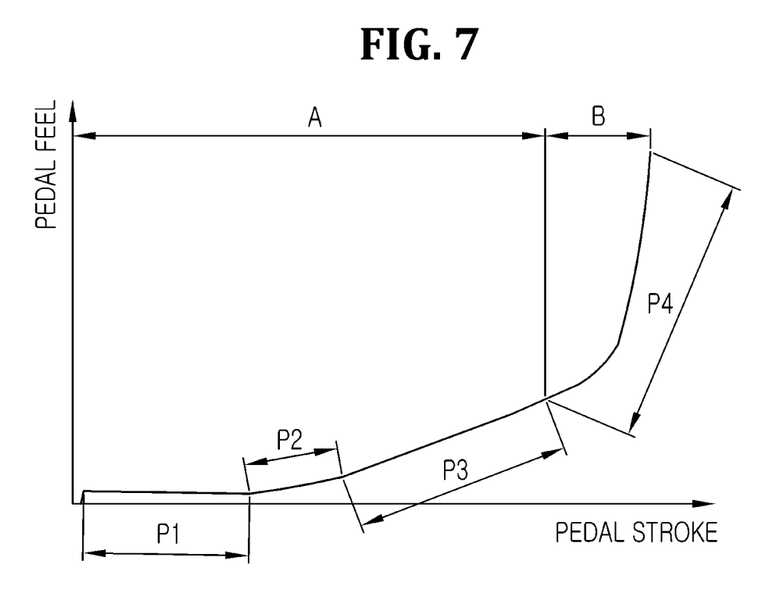
FIG. 7 is a graph a relationship between the pedal stroke produced by a pedal simulator and pedal feel according to one embodiment of the present invention.

FIG. 7 is a graph a relationship between the pedal stroke produced by a pedal simulator and pedal feel according to one embodiment of the present invention.

By arranging the first and second reaction units in series in the pedal simulator 1 and providing the elastic member 400 to the lower surface of the second reaction piston of the second reaction unit, reaction force increases not along a first order straight line (see FIG. 1), but along a second order curve as shown in FIG. 7, which is similar to reaction force produced by a pedal simulator of a conventional brake system. Therefore, good pedal feel is created. Herein, the section P1 represents a braking stage at which reaction force is produced by compression of the first reaction spring 120 according to foot force applied to the brake pedal (see '12' of FIG. 2). Section P2 represents a braking stage at which the reaction force produced by pressing the first damping member 130 is added to the reaction force from the first reaction spring 120. The section P3 represents a braking stage at which the reaction force from the second reaction spring 220 and the reaction force produced by pressing the second damping member 230 are added. The section P4 represents a braking stage at which the reaction force from the second reaction spring 220 and the reaction force produced by pressing the second damping member 230 and the elastic segments 420 of the elastic member 400 are added. Herein, sections P1 to P3 construct the initial stage A of the pedal stroke, and the section P4 is the terminal stage B of the pedal stroke. That is, as shown in the graph, sections P1 to P3 have a maximized width as non-linear sections, while the curve in the section P4 is allowed to rapidly and smoothly rise by the strong reaction force.

Consequently, the pedal simulator 1 for an active brake system according to one embodiment of the present invention adopts prevents contact between the second reaction piston 210 formed of a metallic material and the damping housing 300, allowing the reaction force to smoothly increase when the reaction force is drastically increased at the terminal braking stage. Thereby, the brake pedal feel may be improved.

As is apparent from the above description, a pedal simulator for active brake system according to one embodiment of the present invention is provided with a double damping structure to provide low reaction force at the initial braking stage and provide high reaction force at the terminal braking stage. Thereby, the pedal feel of the brake may be improved.

In addition, a separate elastic member is provided in order to avoid contact between a second reaction piston formed of metal and a damping housing at the terminal braking stage. Thereby, drastic increase of pedal force may be prevented and soft pedal feel may be produced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pedal simulator for an active brake system installed at a master cylinder to receive hydraulic pressure according to a driver's pedal force to provide pedal feel to the driver, the pedal simulator comprising:
   a simulator block provided with an oil hole formed at an upper portion thereof to be connected to the master cylinder, and provided therein with a bore to communicate with the oil hole;
   a damping housing coupled to the bore to seal a lower end of the bore;
   a first reaction unit provided in the bore and adapted to provide reaction force by being pressed by oil introduced from the master cylinder;
   a second reaction unit supported by the damping housing and adapted to provide reaction force by being compressed according to pressing of the first reaction unit; and
   an elastic member provided to the second reaction unit and adapted to provide reaction force by contacting an upper end of the damping housing when the second reaction unit is compressed and moved a certain distance,
   wherein the elastic member comprises a coupling segment coupled to the second reaction piston and a plurality of elastic segments arranged spaced a certain distance from each other along an edge of the coupling segment and extending outward, the elastic segments being inclinedly bent downward to be elastically deformed by contacting the damping housing.

2. The pedal simulator according to claim 1, wherein the first reaction unit comprises:
   a first reaction piston slidably installed in the bore;
   a first damping member installed at the first reaction piston to move together with the first reaction piston; and
   a first reaction spring compressed by the first reaction piston.

3. The pedal simulator according to claim 2, wherein the second reaction unit comprises:
   a second reaction piston provided in the bore to be spaced a certain distance from the first reaction piston and to support the first reaction spring and slide in the bore;
   a second reaction spring installed between the second reaction piston and the damping housing to be compressed by the second reaction piston; and
   a second damping member installed in the damping housing and adapted to be elastically deformed when pressed by the second reaction piston.

4. The pedal simulator according to claim 3, wherein the first damping member and second damping member are formed of rubber to be elastically deformable.

5. The pedal simulator according to claim 3, wherein the damping housing comprises:
   a body spaced a certain distance from the second reaction piston, formed in a shape of a cylinder with an open top, and provided therein with an accommodation space; and
   a flange radially extending from an outer circumferential surface of a lower portion of the body,
   wherein the flange is connected to the bore.

6. The pedal simulator according to claim 5, wherein an upper surface of the flange is provided with a support groove to support the second reaction spring.

7. The pedal simulator according to claim 5, wherein the second damping member is installed in the accommodation space of the body such that a predetermined space is formed between the second damping member and the accommodation space to allow a volume of the second damping member to change when the second damping member is elastically deformed by being pressed.

8. The pedal simulator according to claim 3, wherein the first reaction spring is provided with a modulus of elasticity lower than a modulus of elasticity of the second reaction spring such that the second reaction piston is pushed after the first reaction piston is pushed.

9. The pedal simulator according to claim 1, wherein the elastic member is integrally formed through a press technique.

10. The pedal simulator according to claim 1, wherein the first reaction unit and the second reaction unit are arranged in series in the bore.

11. A pedal simulator for an active brake system installed at a master cylinder to receive hydraulic pressure according to a driver's pedal force to provide pedal feel to the driver, the pedal simulator comprising:
    a simulator block provided with an oil hole formed at an upper portion thereof to be connected to the master cylinder, and provided therein with a bore to communicate with the oil hole;
    a damping housing coupled to the bore to seal a lower end of the bore;
    a first reaction unit provided in the bore and adapted to provide reaction force by being pressed by oil introduced from the master cylinder;
    a second reaction unit supported by the damping housing and adapted to provide reaction force by being compressed according to pressing of the first reaction unit; and
    an elastic member provided to the second reaction unit and adapted to provide reaction force by contacting an upper end of the damping housing when the second reaction unit is compressed and moved a certain distance,
    wherein the first reaction unit comprises:
      a first reaction piston slidably installed in the bore;
      a first damping member installed at the first reaction piston to move together with the first reaction piston; and a first reaction spring compressed by the first reaction piston, wherein the second reaction unit comprises:
- a second reaction piston provided in the bore to be spaced a certain distance from the first reaction piston and to support the first reaction spring and slide in the bore;
- a second reaction spring installed between the second reaction piston and the damping housing to be compressed by the second reaction piston; and
- a second damping member installed in the damping housing and adapted to be elastically deformed when pressed by the second reaction piston, and wherein an insertion groove recessed upward to form a stepped portion is formed at a lower end of the first reaction piston, wherein the first damping member is installed in the insertion groove, and an upper end of the first reaction spring is supported by the stepped portion.

12. The pedal simulator according to claim 11, wherein the second reaction piston comprises:
- a protrusion protruding toward the first damping member such that the protrusion is spaced a certain distance from the first damping member; and
- an extension extending radially outward from a lower end of the protrusion, wherein the protrusion is inserted into the first reaction spring such that a lower end of the first reaction spring is supported by the extension.

13. The pedal simulator according to claim 12, wherein the first damping member contacts the second reaction piston to provide reaction force when the first reaction piston is pushed, and the second damping member is pressed to provide reaction force when the second reaction piston is pushed.

14. A pedal simulator for an active brake system installed at a master cylinder to receive hydraulic pressure according to a driver's pedal force to provide pedal feel to the driver, the pedal simulator comprising:
- a simulator block provided with an oil hole formed at an upper portion thereof to be connected to the master cylinder, and provided therein with a bore to communicate with the oil hole;
- a damping housing coupled to the bore to seal a lower end of the bore;
- a first reaction unit provided in the bore and adapted to provide reaction force by being pressed by oil introduced from the master cylinder;
- a second reaction unit supported by the damping housing and adapted to provide reaction force by being compressed according to pressing of the first reaction unit; and
- an elastic member provided to the second reaction unit and adapted to provide reaction force by contacting an upper end of the damping housing when the second reaction unit is compressed and moved a certain distance, wherein a cap is installed at a lower end of the damping housing to fix the damping housing to the simulator block.

* * * * *